United States Patent [19]

Hunter et al.

[11] 4,029,369
[45] June 14, 1977

[54] TURN PLATE DIRT SEAL

[75] Inventors: Lee Hunter, Ladue; Joseph J. Jasso, St. Louis, both of Mo.

[73] Assignee: Hunter Engineering Company, Bridgeton, Mo.

[22] Filed: Apr. 5, 1976

[21] Appl. No.: 673,416

[52] U.S. Cl. .............................. 308/36.1; 308/187.1
[51] Int. Cl.² ......................................... B60B 35/00
[58] Field of Search ............... 308/3.5, 36.1, 187.1, 308/187.2

[56] References Cited

UNITED STATES PATENTS

| 3,713,709 | 1/1973 | Staiger | 308/36.1 |
| 3,922,039 | 11/1975 | Karpuk et al. | 308/36.1 |

*Primary Examiner*—Robert R. Song
*Assistant Examiner*—Gene A. Church
*Attorney, Agent, or Firm*—Gravely, Lieder & Woodruff

[57] ABSTRACT

A dirt seal for an automotive vehicle wheel turn plate to protect the operating bearings from becoming fouled with dirt so that the function of the bearings will not be impaired, especially when turn plates are carelessly maintained or are used in service areas where fouling conditions are especially severe.

4 Claims, 6 Drawing Figures

TURN PLATE DIRT SEAL

BACKGROUND OF THE INVENTION

This invention relates to turn plate dirt seals, and especially to seals to exclude dirt from the bearings supporting the movable plate portion.

Automotive wheel supporting turn plates have been in existence for many years, and have included a base plate with a top surface acting as a race for bearings which support a top plate supplying the opposite race on its under face and presenting its top face for receiving the wheel. In operation, the turn plate allows a mechanic to place the wheel of an automotive vehicle upon the top plate in position for making it easy to turn the wheel while determining certain alignment characteristics. In turning the wheel the top plate must be free to move laterally as well as swivel, and this freedom of motion is obtained from the bearing means located between the base plate and the top plate.

If the turn plates are to function as intended, it is necessary to protect the bearing means and the bearing race surfaces against becoming fouled by dirt, and fluids which are accidently, or otherwise, spilled on the service floor. In many service areas, the attendant will hose down the floor and wash accumulated dirt, grease, oily substances, and the like into the turn plate. The result is that the bearing become pitted, the race surfaces become coated with foreign matter, and these two effects contribute to produce rapid wear and hard turning response.

The objects of this invention are to provide a dirt seal for turn plates to overcome the known problems in this art; to provide a seal that will not impare the desired function of turn plates; to provide a seal that will maintain the bearings and bearing races free of dirt and harmful matter, and to provide a seal that will remain effective for long periods of time and will be inexpensive to replace when necessary.

The embodiments of this invention comprise a base plate and a top plate having facing surfaces forming races, bearing means engaged on said races to support the top plate from the base plate and accommodate movement of the top plate, intermediate means between the top and bottom plates having an opening of a size to allow the motion of the top plate and any accompanying motion of the bearing means, and a dirt seal disposed in the opening and engaged on the races in position surrounding the bearing means to exclude dirt and foreign matter. The dirt seal may be fixed in position by the intermediate means or it may be carried by and move with the bearing means in the opening of the intermediate means.

BRIEF DESCRIPTION OF THE DRAWINGS

The invention may have several embodiments, and certain preferred embodiments are illustrated in the accompanying drawings, wherein.

DETAILED DESCRIPTION OF THE EMBODIMENTS

Figure 1:
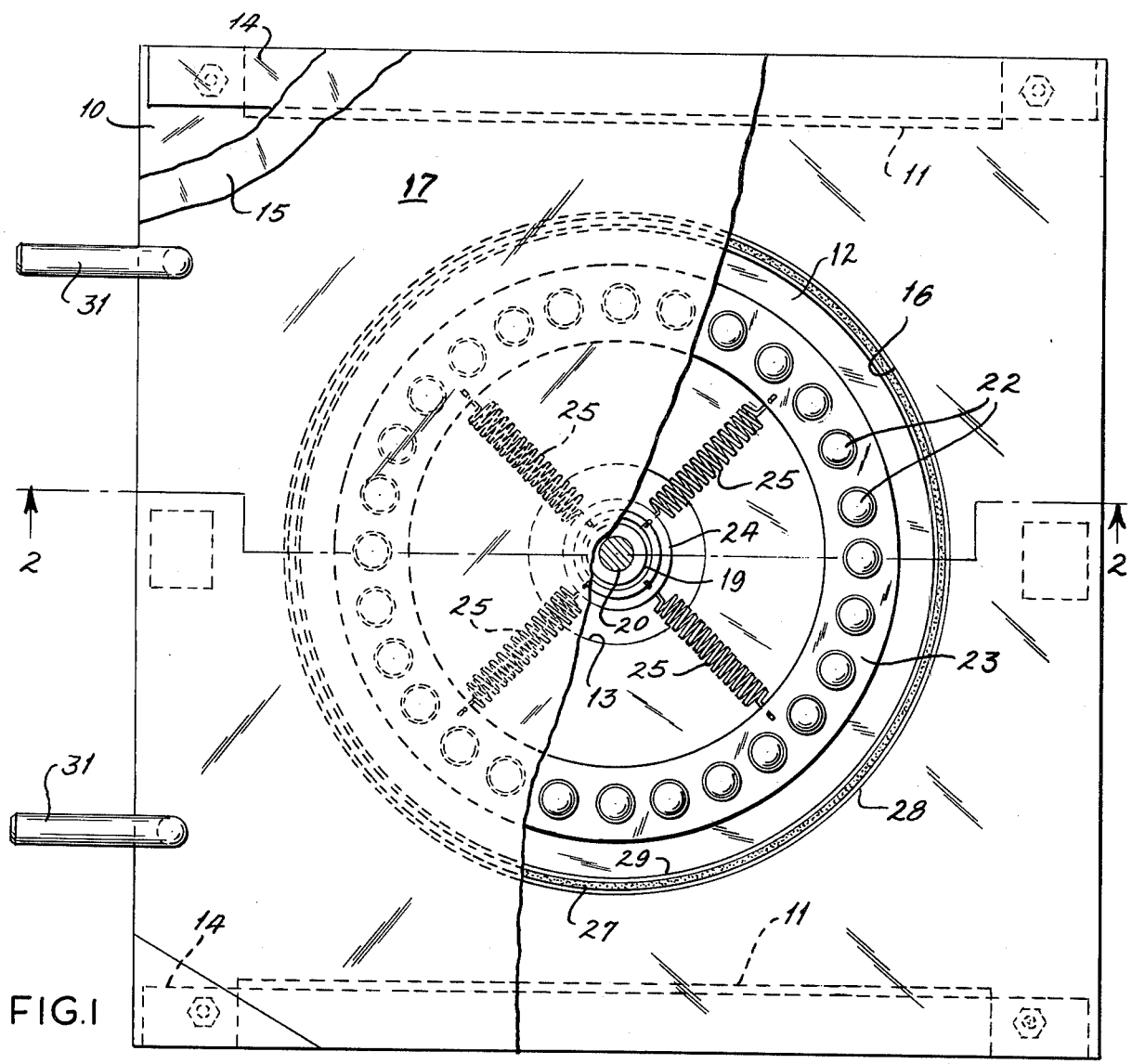
FIG. 1 is a top plan view of a turn plate in which the bearing means is generally centered within an opening in means to hold the dirt seal in a fixed position relative to the bearing means, the view having portions of the top plate and intermediate plate broken away.
Figure 2:
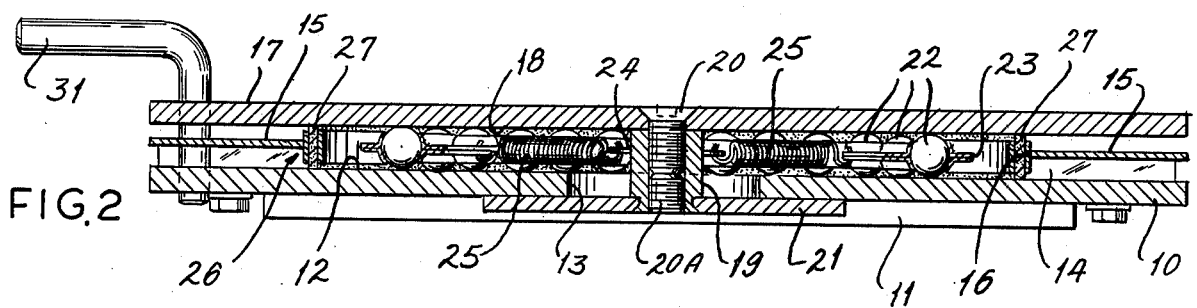
FIG. 2 is a section view taken along line 2—2 in FIG. 1.

In FIGS. 1 and 2 there is shown an embodiment of a turn plate consisting of a bottom plate 10 supported on a pair of foot elements 11 spaced apart across the width of the bottom plate. The bottom plate is formed with an upwardly presented bearing race 12 having the center portion cut off to form a circular opening 13. The upwardly presented bearing race 12 carries a pair of spaced apart spacer bars 14 which are adapted to support an intermediate plate 15 having an enlarged circular aperture 16 for a purpose presently to appear. A top plate 17 is positioned over the intermediate plate 15 and is formed with a downwardly presented bearing race 18. The top plate 17 is connected to a post 19 by means of a threaded element 20, and the post 19 is centrally disposed relative to the top plate 17 so that it may project downwardly through the aperture 13 in the bottom plate to connect with a sliding seal plate 21. The post 19 is riveted or permanently connected to the sliding seal plate 21, and is provided with an internal threaded bore so that the element 20 can detachably secure the top plate 17. The post also receives a set screw 20A for the purpose of preventing the threaded element 20 from being displaced from its normal assembled position.

The upwardly presented race 12 of the bottom plate 10 and the downwardly presented race 18 of the top plate 17 are maintained in spaced facing relation by means of a plurality of ball bearing elements 22 which preferably deposited in suitable apertures in a retainer plate 23. The retainer plate is circular so that the ball bearings 22 are retained in a circular pattern around the center post 19. In order to maintain the ball bearings 22 substantially centered between the bottom plate 10 and the top plate 17 an anchor ring 24 is slipped over the post 19 so as to provide an anchor for the inner ends of a plurality of springs. The outer ends of the springs 25 are engaged in the retainer 23 and the spring arrangement is symmetrical to retain the ball bearings in centered position.

In the assembly thus described, there is provided a dirt seal 26 which is made up of a ring of flexible fiber material 27 held in operative form by an outer band 28 and an inner band 29. The bands 28 and 29 are held in position about the ring 27 by a plurality of rivets 30. The seal 26 is sized so as to snugly fit into the circular opening 16 of the intermediate plate 15, and the seal ring 27 fills the space between the bearing races 12 and 18 so as to be in a position to exclude dirt and foreign matter from invading the working area of the ball bearing means 22.

Figure 3:
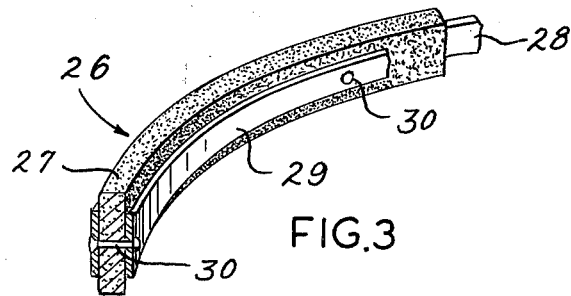
FIG. 3 is a fragmentary perspective view of a dirt seal for the turn plates of the disclosed embodiments.
Figure 4:
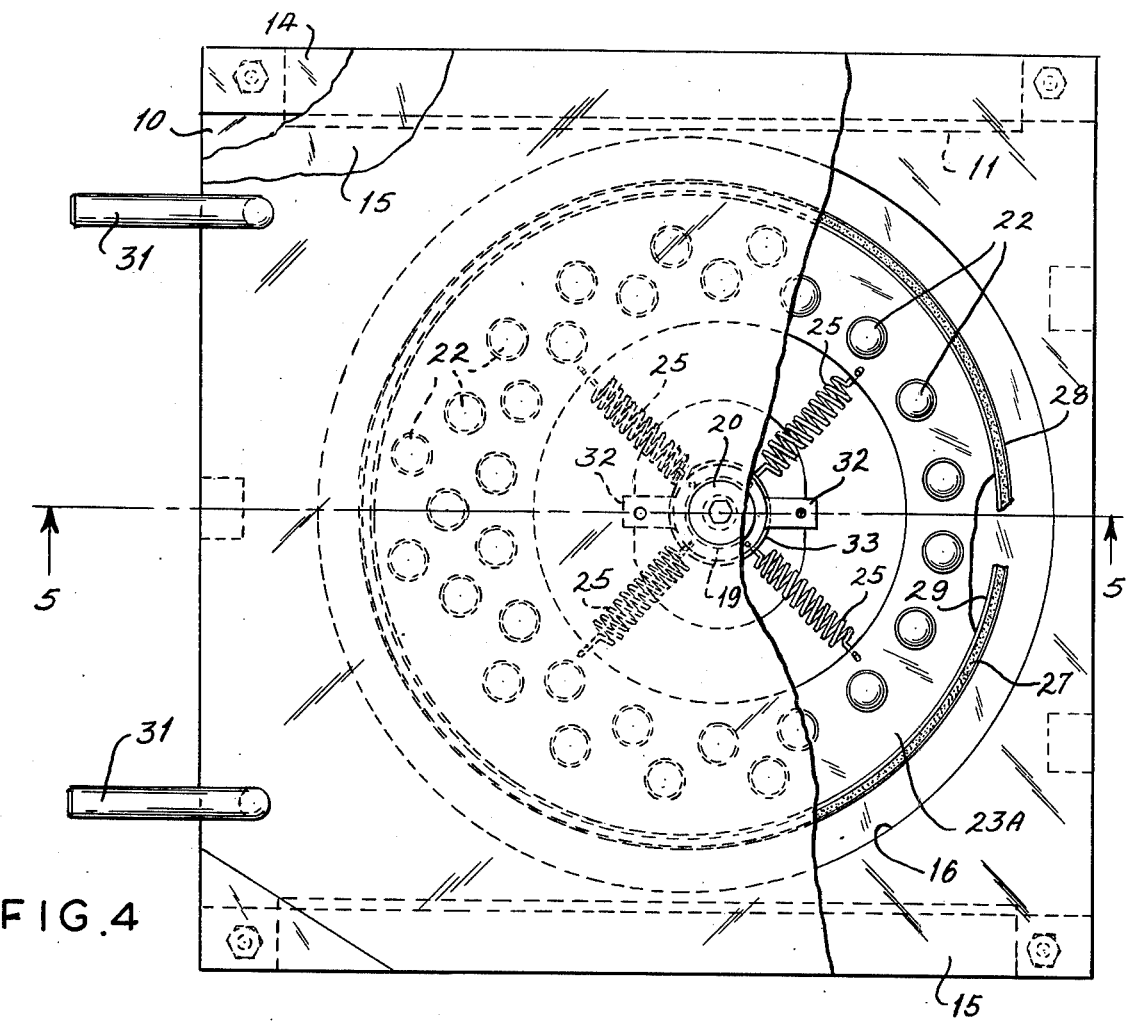
FIG. 4 is a top plan view of a turn plate showing certain modifications over the turn plate of FIG. 1, the view having a portion of the top plate and intermediate plate broken away.
Figure 5:
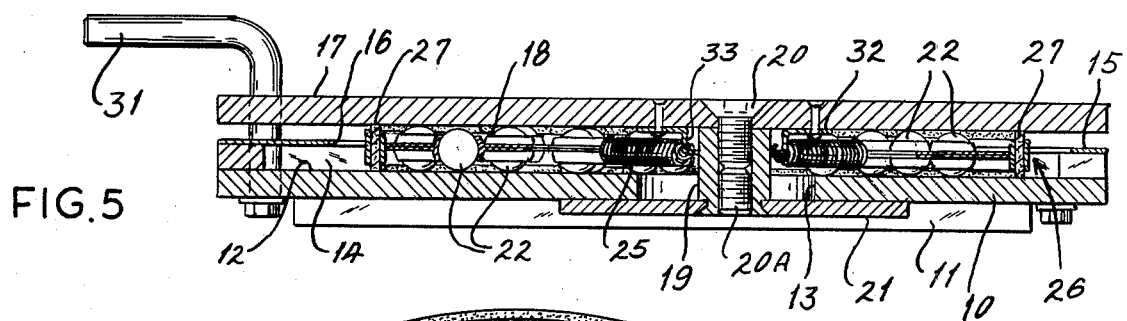
FIG. 5 is a section view taken along lines 5—5 in FIG. 4.
Figure 6:
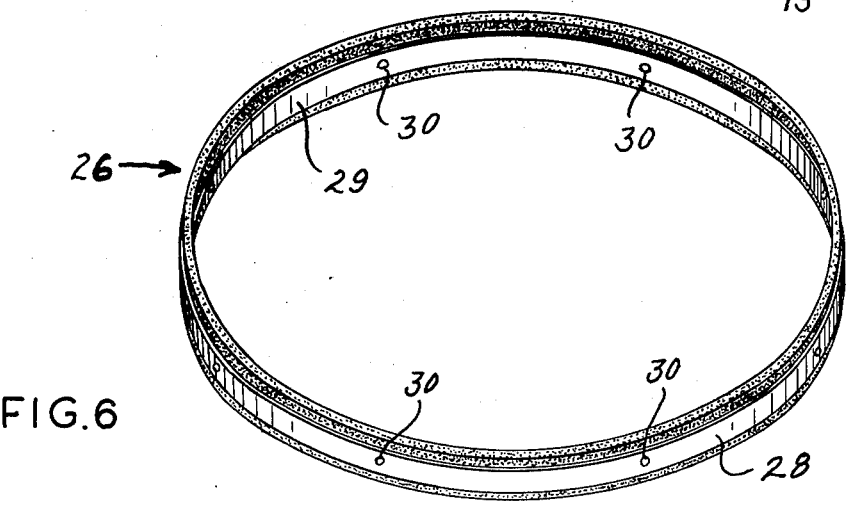
FIG. 6 is a perspective view of a dirt seal which is typical of the seals used in the turn plates seen in FIGS. 1 and 4.

When in turn plate of FIG. 1 is not in use, it is desirable to immobilize the top plate 17 by means of a pair of locking pins 31 which are inserted in aligned apertures in the top plate 17 the intermediate plate 15 and the bottom plate 10. In use, the locking pins 31 withdrawn to free the top plate 17 for movement on the ball bearings 22. The top plate is thereby free to orbit or turn relative to the bottom plate 10 and in so doing the sliding seal plate 21 will maintain a cover over the central aperture 13 in the bottom plate. It is understood that the top plate 17 and the sliding seal plate 21 move as a unit on the ball bearings 22, while the seal 26 is held stationary by the intermediate plate 15. ;p The embodiment of FIGS. 4, 5 and 6 is substantially the same as the embodiment of FIGS. 1, 2 and 3. Accordingly similar parts and elements will be designated by the same reference numerals wherever applicable, and only the differences need to be described.

It can be seen in FIGS. 4 and 5 that the ball elements 22 are supported in a retainer 23A which has an eccentric configuration so that the ball elements 22 are more numerous on one side than on the other. This arrangement of the ball elements 22 and the retainer ring 23A is found to be particularly advantageous in connection with turn plates of small size. For example the turn plate shown in FIG. 4 may be 12 on a side, whereas the turn plate shown in FIG. 1 may be 14 or more on a side.

The arrangement for maintaining the retainer 23A in operative position around the center post 19 includes a bracket 32 which is suitably riveted to the downwardly presented race 18 of the top plate 17, and the bracket has a central hub 33 to which the inner ends of the springs 25 may be connected. The outer ends of the springs 25 are connected to the retainer 23, and the springs are arranged in symmetrically spaced relation so as to normally hold the retainer 23A in a centered position.

As shown in FIG. 5, the intermediate plate 15 has its aperture 16 spaced outwardly from the seal 26 because in this assembly the seal 26 is snugly mounted on the outer periphery of the retainer 23A. In this arrangement the seal 26 moves with the retainer 23A but is in a position to exclude dirt and foreigh matter from the bearing races 12 and 18 since the ring 27 extends between these bearing races.

When the turn plate of FIG. 4 is not in use the top plate 17 is normally locked to the bottom plate 10 by locking pins 31 which extend through aligned apertures in the respective top intermediate and bottom plates.

The turn plates of FIGS. 1 and 4 are adapted to be placed in positions for supporting the steerable wheels of a vehicle to enable effective alignment determination in cases where the steerable wheels must be turned in or out when measuring the alignment characteristics by the necessary instruments adapted for that purpose. Accordingly, the turn plates must be capable of supporting considerable weight and they are normally subjected to the dirt and foreign matter that seems always to be present in alignment service areas. The ball bearings elements 22 are formed of a suitable plastic material so as to be capable of operating without the need for a lubricant. Protection of these ball elements is important and at the same time it is important to permit free turning and orbiting movement of the wheel supporting top plate 17. The present seal means 26 accomplishes the purpose of protecting the ball elements 22 while permitting free movement of the top plate 17 and at the same time functioning to exclude dirt and foreign matter from invading the bearing races 12 and 18 and thereby achieving a significantly longer service life of the bearing means. A further advantage of the present invention is recognized in that the seal 26 is an element of the assembly that can be manufactured of inexpensive material and is easily replaced when necessary by the simple expedient of moving the top plate 17.

The present invention has been disclosed in connection with alternate embodiments which have similar components and operate in similar manners. The significant differences in the embodiments is the manner of mounting the seal between the bottom and top plates.

What is claimed is:

1. A turn plate supporting a vehicle wheel requiring turning in place, said turn plate comprising a flat base plate formed with a bearing race on its upwardly presented surface area surrounding a central opening, an anchor post movable relative to said base and projecting upwardly in said central opening in said bearing race, bearing means surrounding said post and supported on said bearing race for orbital movement about said post, means connecting said bearing means and post and restraining said bearing means to limited orbital movement on said bearing race, a top plate having an upper surface and a bearing race on its downwardly presented surface, said top plate being connected to said anchor post in position to be engaged by the vehicle wheel on its upper surface and with its downwardly presented race engaged on said bearing means, said bearing means holding said base and top plates in spaced relation, and dirt seal means engaged by and disposed between said bearing races and surrounding said bearing means to exclude dirt from an area of said bearing races witnin which said bearing means has its limited orbital movement.

2. The turn plate of claim 1 wherein there is an intermediate plate in the space between said base and top plates, means on one of said base and top plates supporting said intermediate plate in spaced relation therebetween, said intermediate plate having an opening of a size to accommodate the range of orbital movement of said bearing means on said races, and said dirt seal being disposed within said intermediate plate opening.

3. The turn plate of claim 1 wherein said bearing means includes a plurality of bearing elements and a retainer for said bearing elements, and said dirt seal is carried by said retainer to move therewith and slidingly engage on said bearing races of said base and top plates.

4. The turn plate of claim 1 wherein stationary means is mounted on said base plate and is formed with an opening of a size to accommodate the range of orbital movement of said bearing means, and said dirt seal is held by said stationary means in said opening in position to have a sliding engagement on said top plate and a stationary engagement on said base plate.

* * * * *